(12) United States Patent
Sim et al.

(10) Patent No.: US 8,050,669 B2
(45) Date of Patent: Nov. 1, 2011

(54) BEACON GROUP MERGING

(75) Inventors: Hong Cheng Michael Sim, Singapore (SG); Poy Boon Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 11/719,155

(22) PCT Filed: Nov. 8, 2005

(86) PCT No.: PCT/SG2005/000380
§ 371 (c)(1),
(2), (4) Date: Feb. 7, 2008

(87) PCT Pub. No.: WO2006/052221
PCT Pub. Date: May 18, 2006

(65) Prior Publication Data
US 2008/0268886 A1     Oct. 30, 2008

(30) Foreign Application Priority Data
Nov. 12, 2004   (SG) ............................... 200406662-7

(51) Int. Cl.
*H04M 11/00* (2006.01)
*H04B 7/00* (2006.01)
(52) U.S. Cl. ........................................ 455/421; 455/500
(58) Field of Classification Search .................... None
See application file for complete search history.

(56) References Cited

U.S. PATENT DOCUMENTS

| | | | |
|---|---|---|---|
| 5,850,609 A * | 12/1998 | Sugarbroad et al. | 455/456.1 |
| 6,574,266 B1 | 6/2003 | Haarsten | 375/240.01 |
| 6,754,250 B2 * | 6/2004 | Haartsen | 375/132 |
| 6,763,013 B2 * | 7/2004 | Kennedy | 370/338 |
| 2002/0156861 A1* | 10/2002 | Pierce | 709/217 |
| 2002/0183004 A1* | 12/2002 | Fulton et al. | 455/41 |
| 2005/0243765 A1* | 11/2005 | Schrader et al. | 370/328 |
| 2006/0040701 A1* | 2/2006 | Long et al. | 455/525 |

FOREIGN PATENT DOCUMENTS
EP        1172969 A2    1/2002

OTHER PUBLICATIONS

Schrader, Method of Creating, Controlling, and Maintaining a Wireless Communication Mesh of Piconets, U.S. Appl. No. 60/490,388, Jul. 25, 2003, pp. 2, 125-126.*
PCT International Search Report (3 pages), Dec. 5, 2005.
Written Opinion of the International Searching Authority (3 pages), Dec. 5, 2005.

* cited by examiner

*Primary Examiner* — Yuwen Pan
*Assistant Examiner* — Ayodeji Ayotunde
(74) *Attorney, Agent, or Firm* — Baker Botts L.L.P.

(57) ABSTRACT

A method of merging two or more beacon groups (BGs), each BG comprising one or more wireless devices, the method comprising, determining a leader BG based on merging information broadcast by two or more devices of different BGs, said devices being within radio range of each other; and merging the two or more BGs into the leader BG; wherein the merging information of each device comprises an extension indication, the extension indication being positive if another device of a same BG as said each device is out of radio range of said each device, and negative otherwise.

13 Claims, 7 Drawing Sheets

BEACON GROUP MERGING

CROSS-REFERENCE TO RELATED APPLICATIONS

The present application claims benefit to Singapore Application No. 200406662-7 filed Nov. 12, 2004 and PCT Application No. PCT/SG2005/000380 filed Nov. 8, 2005.

FIELD OF INVENTION

The invention relates broadly to a method of merging two or more beacon groups (BGs), to a wireless device for use in BG-based networking, and to a storage device having stored thereon computer code means for instructing a wireless device to execute a method of merging two or more BGs.

BACKGROUND

In view of numerous shortfalls of the Wireless Personal Area Network (wPAN) Media Access Control (MAC) protocol of the IEEE standard 802.15.3, which is based on a centralized-control protocol, the Multi-Band Orthogonal Frequency-Division Multiplexing (OFDM) Alliance (MBOA) group started a MBOA MAC subgroup. The MBOA MAC is based on a distributed protocol rather than a centralized-controlled protocol as used in the IEEE 802.15.3 MAC. In order for every wireless device to be able to form a network by itself, each device is typically required to beacon in a distributed manner in a superframe.

The beginning of the superframe is typically reserved for beacon transmission. The number of Media Access Slots (MAS) used for beaconing purposes is defined as a Beacon Period (BP) and the remainder of the MAS in the superframe are used for data transfer. The BP is typically dynamic in length and consists of a dynamic number of beacon slots, which extends across up to 20 contiguous MAS. A Beacon Group (BG) is defined as a group of devices which synchronize their beacon transmissions within the same group of MAS in the superframe and which identify these MAS as their BP. The BP expands when new devices join the BG and contracts when devices leave the BG.

Since coexistence of independent BGs typically poses a problem In relation to decentralized network implementation, under the MBOA MAC standard, when two or more BGs are within range of each other, devices of the BGs coalesce to a single BP. The BP of one of the BGs is therefore expanded to accommodate the beacon transmissions of the joining devices from other BGs. However, in the MBOA MAC v0.6 draft specification, there is currently no defined method to select which BG's BP should remain unchanged and which BG should synchronise to join the unchanged BG. When two or more BGs merge, the BG that expands its BP to accommodate devices from other BGs is termed as the Leader BG (LBG) while the remainder of the BGs that coalesce into the LBG are termed as Follower BGs (FBGs).

Devices in a FBG have to change their beacon slots (BS) as well as reschedule or re-negotiate their other data transfer reservations, if any, when the FBGs merge into the LBG. For best device performance considerations, no device would voluntarily choose to be the one to merge into another BG. Therefore, a set of rules is needed so that every device can decide during BG merging whether it should continue beaconing in its current BG or join another BG based on the rules. The rules should enable every device to be able to determine whether its BG is the LBG or a FBG when it comes into range of one or more BGs.

A LBG selection method should ensure fairness. For selection to be fair, the least network disruption should be incurred When considering a selection based on the least impact on existing network topology, the selection can be defined such that a smaller BG always joins a bigger BG so that fewer devices are affected by the merging. Thus, during BG merging, the BG with the most number of member devices-assumes the LBG role and the rest of the BGs, being FBGs, coalesce into the LBG. However, one problem with this selection method is that BG size is typically a temporary value which is subjected to unpredictable changes in every superframe since devices can enter or leave at any time in a WPAN. Another problem is that the total number of devices in a BG is typically not propagated throughout the entire BG. This is true for WPANs where devices can typically only see other devices that are up to 2 hops away.

When considering a selection based on the least impact on ongoing data transfer, in the context of MBOA MAC, the selection is defined such that a BG with comparatively lesser existing data transfer reservations joins a BG with comparatively more existing data transfer reservations. One problem associated with this selection method is that a typical data transfer reservation count is even more temporary than BG size, even when BG size remains unchanged. Another problem is that the total data transfer reservation count is typically not propagated throughout the BG.

In existing attempts to counter the problems of local/neighbouring selection criteria that are based on temporary values as mentioned above, globally consistent selection criteria can be used. One such criteria is network time, which is typically the running clock value in every device. However, one problem with selecting a LBG using network time is that high accuracy clocks are typically required to ensure that all devices in the same BG report the same network time in every superframe.

Another globally consistent selection criteria that has been considered is the usage of the MAC address of each Device ID (DEVID) since the MAC address is consistent and fixed throughout network operation. However, a problem with this selection criteria is that the selection is typically consistently unfair to devices with less advantageous MAC addresses or DEVIDs in terms of the selection criteria used, such as alphabetical order, etc.

Hence, there exists a need to provide a method or system of Beacon Group merging to address one or more of the above problems.

SUMMARY

In accordance with a first aspect of the present invention, there is provided a method of merging two or more beacon groups (BGs), each BG comprising one or more wireless devices, the method comprising determining a leader BG based on merging information broadcast by two or more devices of different BGs, said devices being within radio range of each other; and merging the two or more BGs into the leader BG; wherein the merging information of each device comprises an extension indication, the extension indication being positive if another device of a same BG as said each device is out of radio range of said each device, and negative otherwise.

The merging information may further comprise a number of neighbouring devices of the same BG and within radio range of said each device.

The extension indication may be based on whether said another device is within radio range of one of said neighbouring devices.

If the respective indications of all of the two or more devices are negative, the leader BG may be chosen as the BG of the device having the highest number of neighbouring devices.

If there are two or more devices having the same highest number, the leader BG may be determined based on an age of the different BGs.

If one or more of the respective indications of the two or more devices are positive, the leader BG may be determined based on an age of the different BGs.

Devices with a negative indication having a number of neighboring devices lower than any one of the devices with a positive indication may be excluded prior to determining the leader BG based on the age of the different BGs.

If two or more BGs have the same age, the leader BG may be determined based on an earliest beacon period start time between said two or more BGs.

In accordance with a second aspect of the present invention, there is provided a wireless device for use in BG-based networking, the device comprising, means for broadcasting merging information of the device; means for receiving merging information of one or more other devices from one or more other BGs; means for determining a leader BG based on the merging information of the device and the merging information of the other devices, and means for merging the BGs into the leader BG; wherein the merging information of each device comprises an extension indication, the extension indication being positive if another device of a same BG as said each device is out of radio range of said each device, and negative otherwise.

The merging information may further comprise a number of neighbouring devices of the same BG and within radio range of said each device.

The extension indication may be based on whether said another device is within radio range of one of said neighbouring devices.

If the respective indications of all of the devices are negative, the means for determining a leader BG may choose the leader BG as the BG of the device having the highest number of neighbouring devices.

If there are two or more devices having the same highest number, the means for determining a leader BG may determine the leader BG based on an age of the different BGs.

If one or more of the respective indications of the devices are positive, the means for determining a leader BG may determine the leader BG based on an age of the different BGs.

Devices with a negative indication having a number of neighboring devices lower than any one of the devices with a positive indication may be excluded prior to determining the leader BG based on the age of the different BGs.

If two or more BGs have the same age, the means for determining a leader BG may determine the leader BG based on an earliest beacon period start time between said two or more BGs.

In accordance with a third aspect of the present invention, there is provided a storage device having stored thereon computer code means for instructing a wireless device to execute a method of merging two or more beacon groups (BGs), each BG comprising one or more wireless devices, the method comprising determining a leader BG based on merging information broadcast by two or more devices of different BGs, said devices being within radio range of each other; and merging the two or more BGs into the leader BG; wherein the merging information of each device comprises an extension indication, the extension indication being positive if another device of a same BG as said each device is out of radio range of said each device, and negative otherwise.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiment described herein can provide a method or system of Beacon Group merging that may result in the least network disruption.

In the example embodiment, in every beacon frame broadcast by each device of a BG during beaconing, information for BG merging known as Merge Selection Criteria (MSC) is sent together with the beacon frames. A LBG is selected based on the merging information MSC. To facilitate LBG selection, the MSC comprises two sub-information which are: the Beacon Group Superframe Count (BGSC) and the Local Device Count (LDC).

The BGSC of each BG is defined as the number of superframes that have passed in the BG since the start of the BG. Thus, the BGSC of the MSC of each device in the same BG is the same value and reflects the age of the BG. The LDC of a local device is defined as the total number of devices in the same BG within the radio range of the local device. This number is equal to the number of neighbour devices in the same BG plus 1 for the local device itself. The LDC further comprises information to indicate whether the neighbour devices of the local device are within radio range of any other devices that the local device is out of range of. In other words, the MSC of the local device comprises a combination of the local size of the BG, an indication or flag of any BG extension beyond neighbour devices and the age of the BG in terms of the number of superframes passed in the BG. In the example embodiment, the BGSC and the LDC information are updated In every superframe. The updated MSC is then broadcast in every superframe together with the beacon frames of the devices. In the example embodiment, when devices belonging to other BGs are detected, the local device compares the local MSC with the MSCs of these devices. Based on the comparison of the MSCs, the LBG is decided among the BGs.

Figure 1:
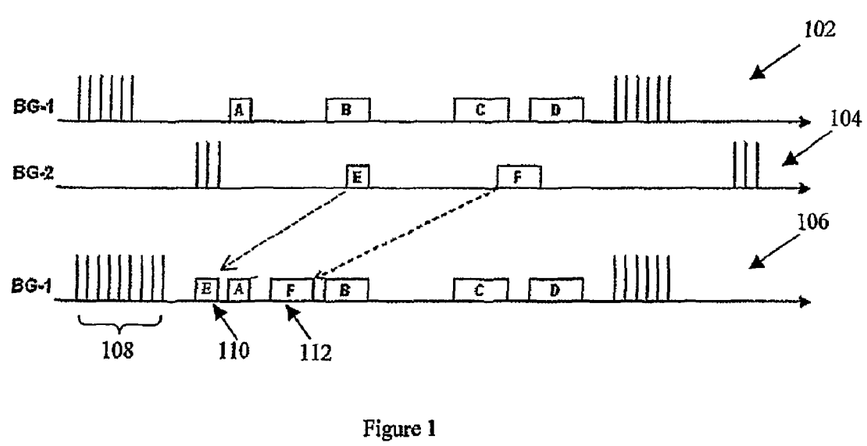
FIG. 1 is a schematic timeline illustration relating to a first Beacon Group assuming the role of a Leader Beacon Group (LBG) and a second Beacon Group merging into the LBG in an example embodiment.

FIG. 1 is a schematic timeline illustration showing a first BG 102 with data reservations A, B, C and D and a second BG 104 with data reservations E and F. The first BG 102 assumes the role of a LBG after comparison of the MSCs and the second BG 104 merges into the first BG 102. The resulting LBG 106 has its superframe containing an expanded BP 108 and new data reservations 110, 112. The data reservations 110, 112 belonged to the now-merged second BG 104.

When deciding on a LBG based on comparing the MSCs of merging devices, higher priority is given to a selection based on comparing the total size of the BGs so as to minimize the number of affected devices that have to switch BGs during merging. However, in the example embodiment, selection based on the total size of the BGs is used only when the total size of all BGs can be determined. In other words, total size of each BG is used as a basis for selection when there are no extended BGs indicated in the LDCs in all merging devices, since the size of a BG cannot be determined if there are any extended BGs present. In the example embodiment, if the LBG cannot be selected by comparing BG sizes either due to equal BG sizes or due to the presence of extended BGs, the LBG is then selected by comparing the BGSCs of the BGs. Any subsequent tie in the comparison of the BGSCs is resolved by comparing the Beacon Period Start Time (BPST) of the BPs of the BGs. Before comparing BGSCs, a prior exclusion from the BGSC comparison of non-extended Bs with sizes smaller than the extended BGs is first carried out. This exclusion will be described in further details below.

Returning back to the LDC, the LDC of a local device provides two indications of the local device to other devices. The first indication is the number of devices belonging to the same BG of the local device. This number comprises the device itself and all devices whose beacons can be heard by the device. The second indication provided by the LDC is whether there are any devices in the same BG that the device is unable to hear but these devices can be heard by its neighbour devices that are in the same BG of the device. Therefore, the LDC indicates whether the BG of the local device is extended beyond its neighbour devices that are in the same BG.

Figure 2:
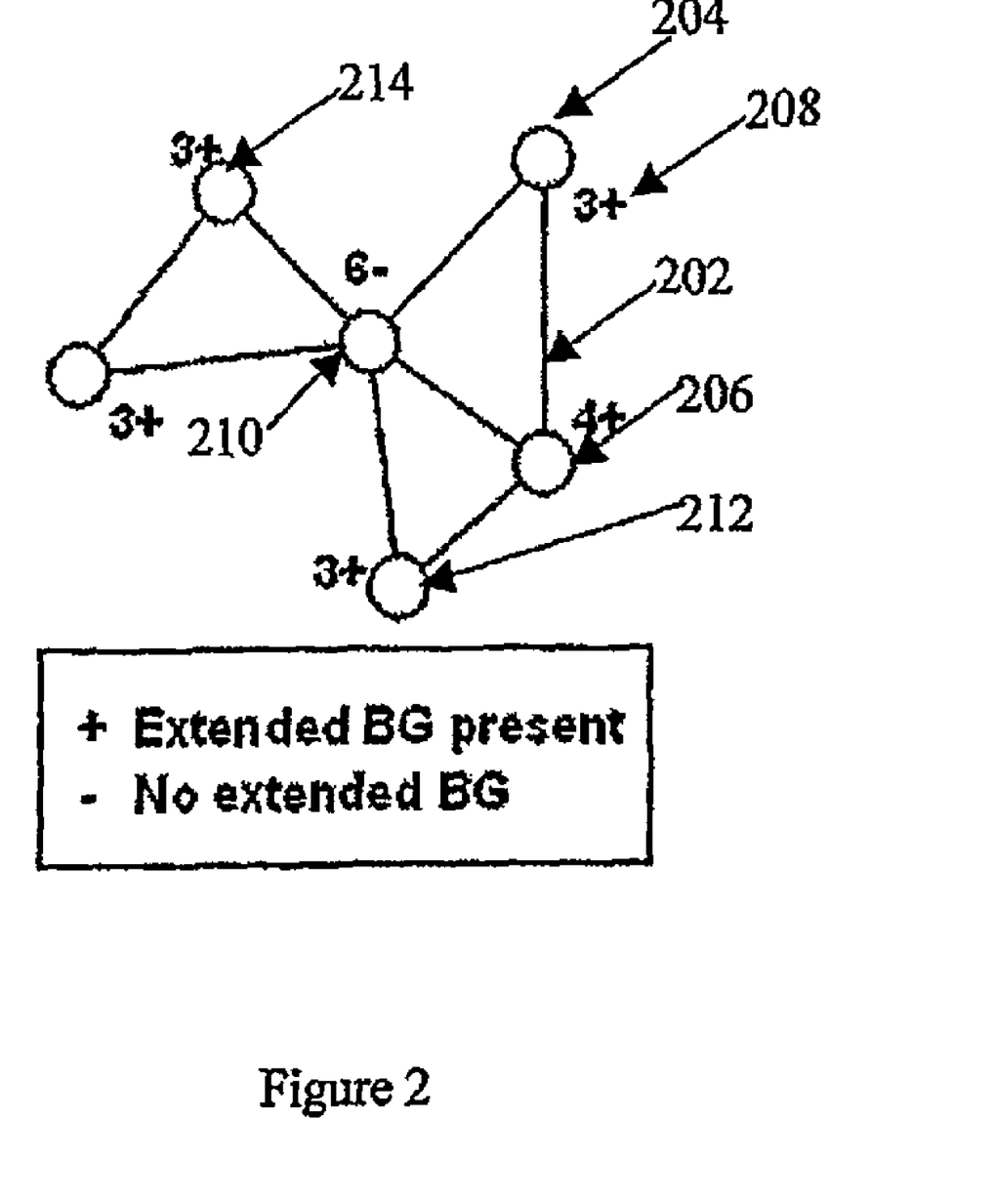
FIG. 2 is a schematic illustration showing the Local Device Count (LDC) of each device in a sample network topology in an example embodiment.

FIG. 2 is a schematic illustration showing the LDC of each device in a sample network topology in the example embodiment. The links e.g. 202 between two devices e.g. 204, 206 indicate that the devices 204, 206 are within radio range of each other. The LDC e.g. 208 of each device e.g. 204 comprises a number and a "+" or a "−" sign. The number indicates the local device population i.e. the number of devices within radio range plus 1 for the local device itself. The "+" sign indicates the presence of an extended BG beyond the device's neighbour. On the other hand, the "−" sign indicates that there is no extended BG beyond the device's neighbour. Hence, the LDC count with a "−" sign indicates the total device count for the entire BG. For example, device 204 has a LDC of "3+" as it is within radio range of devices 206 and 210, and has an extended BG since other devices e.g. 212, 214 cannot be heard by it (ie. device 204). Device 210 has a LDC of "6−" indicating that it is within radio range of all other five devices and that there are no extended BG with respect to itself (ie. device 210).

After describing the composition of the MSC of each device, the propagation and broadcast of the MSC is described in the following. When a device first starts up, the device scans the wireless medium for any existing BG. If there is no BG present the device starts a new BG and initializes its BGSC to 1, thus indicating that it is broadcasting in the first superframe of the new BG. The device initialises its LDC to "1−" indicating that there is only one device in the vicinity (i.e. the local device itself) and that there is no extended BG. The MSC information, comprising both the BGSC and the LDC, is sent on the first beacon frame that the device broadcasts in the superframe. On the other hand, if the device detects one or more BGs in the vicinity after starting up, it can choose one BG to join, and adopts the BGSC broadcast in the received beacons from the BG. In this later scenario, the device chooses the BG by comparing the MSC information broadcasted by the one or more BGs in the vicinity without broadcasting its own beacon.

As described above, the BGSC is incremented by 1 on every superframe so that the age of the BG can be determined. The LDC broadcast in every superframe is updated every superframe and is derived from beacon information from the devices in the same BG received in the previous superframe. In other words, the LDC count is determined from the number of devices whose beacons were heard in the BP of the last superframe. In addition, the beacons of neighbour devices heard in the last superframe contain information of their neighbour devices or devices out of radio range of the local device. In the MBOA MAC standard, this information is presented in the Beacon Period Occupancy Information Element (BPOIE) in the beacon frame. From the BPOIE, if there are devices that can be heard by the neighbour devices but not by the local device, the LDC indicates the presence of extended BGs.

In the example embodiment, the LBG is selected by comparing the MSCs between the different BGs. In situations when devices of a BG discover that there are devices belonging to other BGs present within wireless range, the devices coalesce into a single BG, as is mandatory in the context of the MBOA MAC v0.6 standard. The LBG is selected in a distributed manner. In a BG, each local device first examines if there are any devices with extended BGs indicated in its MSC.

If there are no devices having an extended BG, the LBG is selected based on the the total sizes of the BGs, i.e. the BG with the largest device count is chosen as the LBG, resulting in fewer devices having to switch BGs. In the above scenario, the LBG is decided by comparing the device count in the LDCs of the devices in radio range. If there is a tie during the LDC comparison between the devices from different BGs, the respective BGs are short-listed and further compared using the BGSC of the short-listed BGs.

On the other hand, if there are devices with extended BGs indicated in their LDCs, the LBG is not decided on the basis of BG sizes, as the number of devices beyond each extended BG cannot be determined from the LDCs. Instead, in the example embodiment, the LBG is decided by comparing the BGSC of the devices of the BGs. However, before performing BGSC comparison, the highest LDC value from the devices with extended BGs ie. $LDC_{EXMAX}$ is determined. After determining $LDC_{EXMAX}$, the devices with non-extended BGs and with device-counts lower than $LDC_{EXMAX}$ are discarded before the BGSC comparison.

Figure 3:
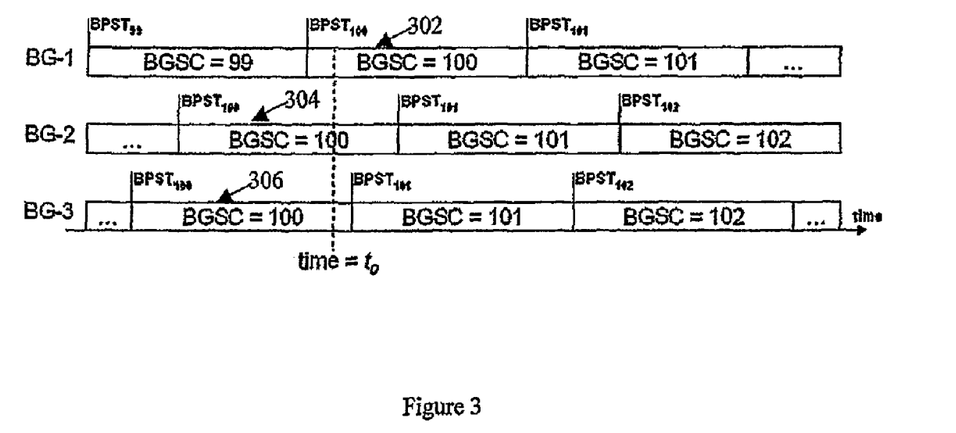
FIG. 3 is a schematic timeline illustration showing Beacon Period Start Time comparison for three Beacon Groups in an example embodiment.

Turning now to the BGSC comparison between devices, the BG having one or more devices with the highest BGSC becomes the LBG. In a scenario where there is more than one BG having devices with the same highest BGSC value, the BG with the earliest BPST among these BGs is selected as the LBG. FIG. 3 is a schematic timeline illustration showing BPST comparison for three BGs in the example embodiment. If a BGSC comparison between three representative devices from three different BGs namely, BG-1, BG-2 and BG-3, is performed at time $t_0$, the result is a tie since the superframes 302, 304 and 306 respectively have an identical age or BGSC value of 100. Based on a subsequent BPST comparison, ie. comparing the times of $BPST_{100}$, BG-3 is then selected as the LBG since it has the earliest BPST.

In the example embodiment, devices merging into the LBG synchronise their beacon frames to beacon in the BP of the LBG. Data reservation slots are also negotiated in the LBG. Upon merging, the devices adopt the BGSC of the LBG and broadcast their updated MSCs together with their beacon frames.

Figure 4:
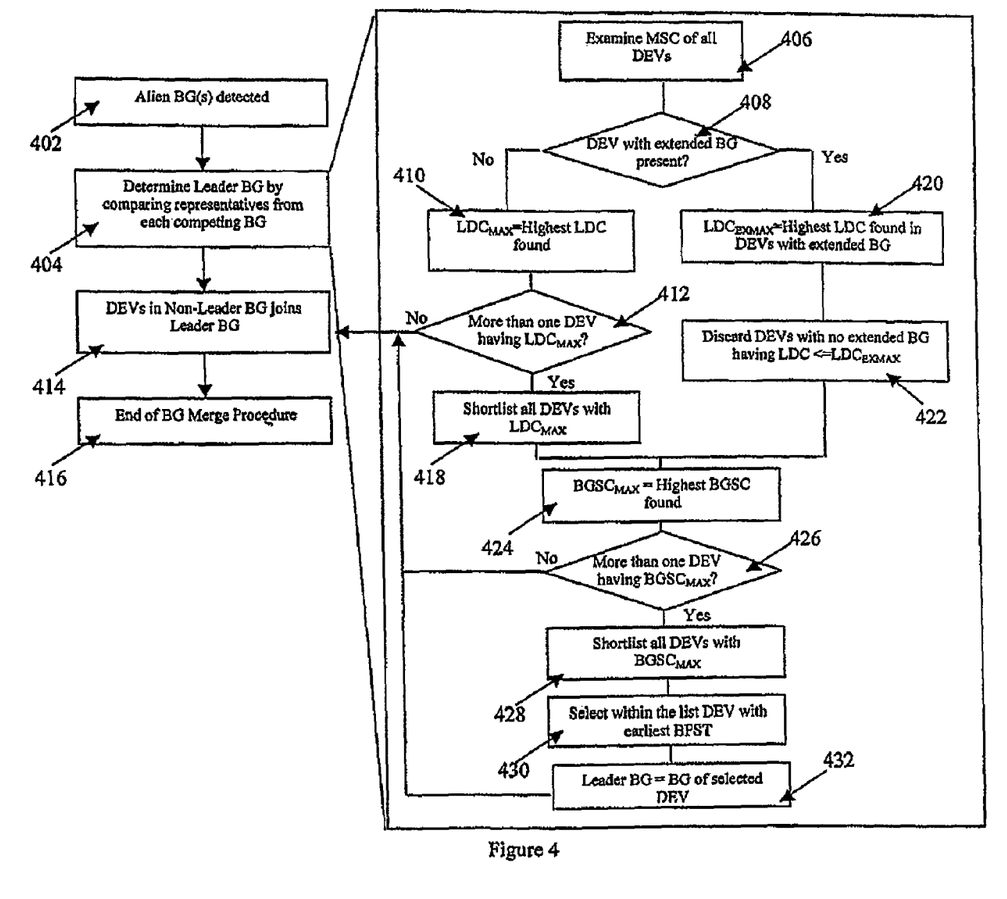
FIG. 4 is a flowchart illustrating a process of beacon group merging in an example embodiment.

FIG. 4 is a flowchart illustrating the process of BG merging in the example embodiment. At step 402, the process of LBG selection is started when a local BG detects another BG(s) within its radio range. At step 404, comparisons based on the MSCs of representative devices from each competing BG are carried out. These in-range devices are referred to here as representative devices because these devices "represent" their respective BGs by broadcasting information describing their respective BGs in their beacons. In more detail, step 404 comprises the following sub-steps. At step 406, the MSCs of all the devices are examined. At step 408, the LDC information of the MSCs is examined to determine if there are any extended BGs present, in relation to the devices. If there are no extended BGs detected at step 408, then at step 410, the highest LDC value ie. $LDC_{MAX}$ among the devices is determined. At step 412, the devices are examined to determine if there is more than one device having $LDC_{MAX}$.

If there is only one device determined at step 412, then the BG containing the device is selected as the LBG and at step 414, the other devices in the other BGs commence merging into the selected LBG. At step 416, after merging has been completed, the BG merging process is ended. However, if there is more than one device having $LDC_{MAX}$ at step 412, at step 418, devices having the $LDC_{MAX}$ value are shortlisted for BGSC comparison (BGSC comparison is carried out at numeral 424, as described later).

Returning to step 408, if any extended BG is detected from the LDCs of the devices, then the LBG cannot be selected by only comparing the device-count of the devices. At step 420, the highest LDC value from the devices with extended BGs ie. $LDC_{EXMAX}$ is determined and at step 422, the devices with non-extended BGs and with device-counts lower than $LDC_{EXMAX}$ are discarded so that the least network disruption can be achieved after the subsequent BGSC comparison at step 424.

At step 424, based on the determination carried out at step 418 or step 422, BGSC comparison between the remaining devices is carried out and the highest BGSC value ie. $BGSC_{MAX}$ is determined. At step 426, the devices are checked to determine if there is more than one device having $BGSC_{MAX}$. If there is only one device determined at step 426, the BG containing the device is selected as the LBG and the merging of the BGs is carried out at step 414 and the merging process ends at numeral 416. However, if there is more than one device having. $BGSC_{MAX}$ at step 426, these devices are shortlisted at step 428. At step 430, the device with the earliest Beacon Period Start Time (BPST) is selected from the shortlist of step 428. At step 432, the LBG is selected as the BG containing the device with the earliest BPST, as determined at step 430. Merging of the BGs into the selected LBG is carried out at step 414 and the merging process ends at numeral 416.

Figure 5:
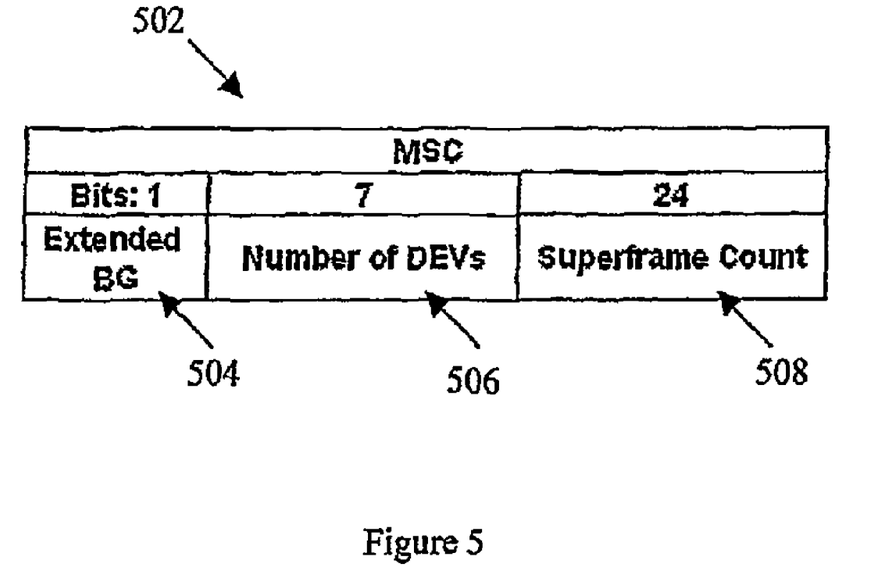
FIG. 5 is a schematic illustration showing the components of a Merging Selection Criteria (MSC) information in an example embodiment.

For a typical WPAN in the example embodiment where wireless devices have short lifespans and are highly mobile, using 24 bits (or 3 bytes) to represent the BGSC of the WPAN provides a maximum age of about 12 days (this estimation is based on MBOA MAC superframe length definition of 65 ms each) which is enough for typical usage scenarios. The BGSC length is not limited to 24 bits and can be varied between 8 to 64 bits but preferably between 16 to 32 bits, depending on application requirements. As for composing the LDC in the example embodiment, 8 bits (or 1 byte) are used. Out of the 8 bits, 7 bits are used for counting the number of devices, hence providing for a maximum count of 127 devices (compare the MBOA MAC v0.6 standard where a BP can typically accommodate a maximum of 60 devices) while the remaining 1 bit of the LDC is used as a flag to indicate whether there is any extended BG beyond the neighbour devices of the local device. The number of bits for composing the LDC can be varied, depending on usage scenarios. For example, counting of the devices can be varied between 2 to 16 bits but preferably between 4 to 8 bits while the flag can be represented by 1 to 8 bits but preferably by 1 bit only. With reference to FIG. 5, one possible way of representing the MSC using the 24-bit BGSC and 8-bit LDC in the example embodiment is illustrated. The MSC 502 comprises the 1-bit flag 504, the 7-bit device count 506 and the BGSC 608.

In the example embodiment described above, during merging of two or more BGs, the LBG is selected consistently based on comparisons carried out on the size and/or the age of each BG. The sizes of BGs are used in a higher priority comparison when the total size of each BG can be determined. This may reduce overheads when a bigger BG coalesces with a smaller BG and may cause the least disruption to network topology when the total size of a BG cannot be determined, the example embodiment then uses the age of each BG for comparison. This can reduce the possibility of an older BG from reconfiguring due to a new BG coming into radio range. The example embodiment employs constant broadcasting of MSC of every device in every superframe of the BGs to achieve the above. As each MSC conveys current age and the local or total size of each BG (depending on whether there are further extensions of the BG beyond neighbour devices) in every superframe, BG merge can be performed at every superframe. Furthermore, the example embodiment only uses the MSC information for LBG selection and thus does not invoke any message exchanges. This can provide a fast and automatic mechanism for the MAC to select a LBG immediately for merging once a device of different BG is detected. In addition, by defining the age of the BG in terms of number of superframes, globally consistent selection can be made possible without the need for high accuracy clocks.

Figure 6:
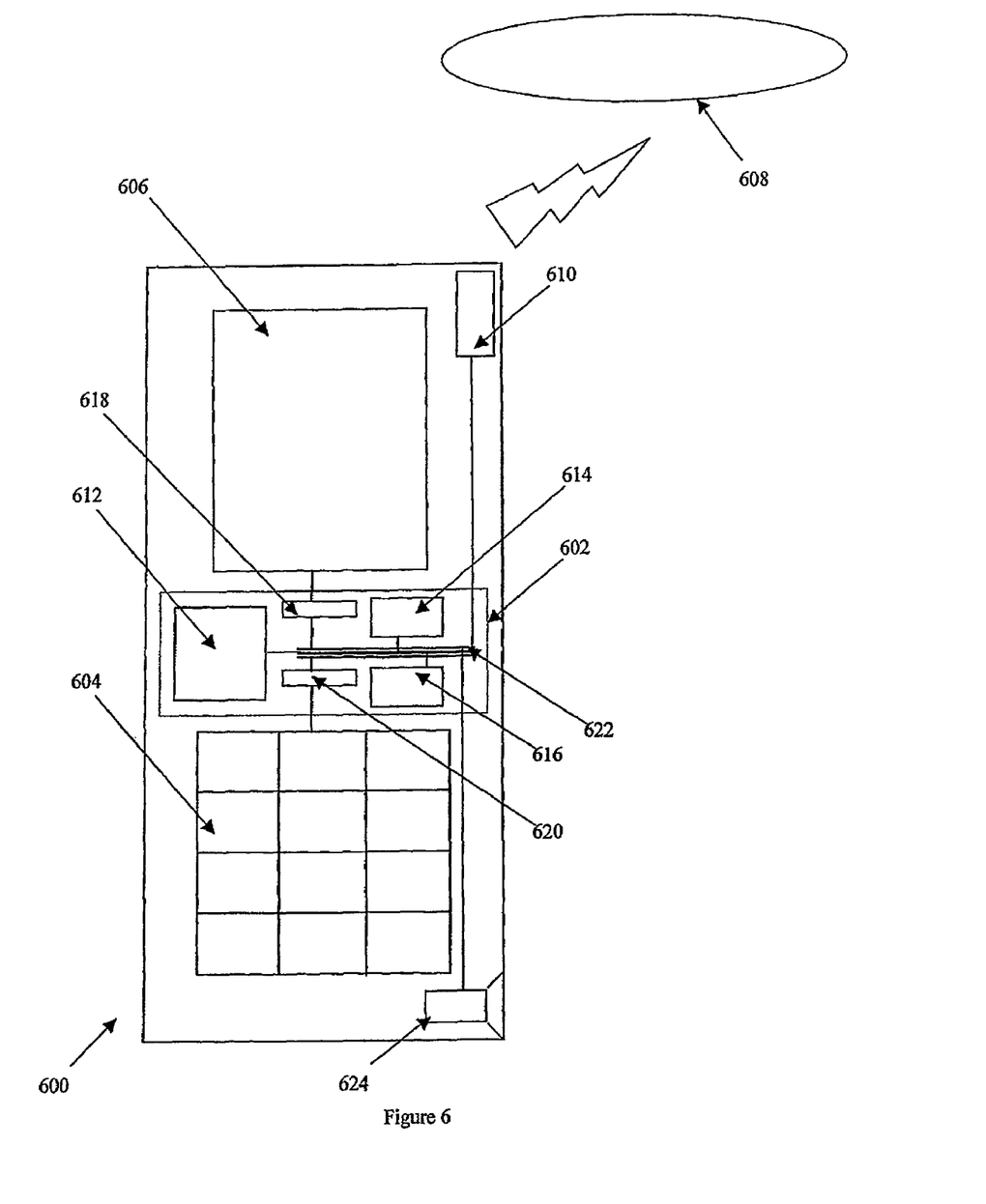
FIG. 6 is a schematic illustration of a wireless device for implementing a method of beacon group merging in an example embodiment.

The method of the example embodiment can be implemented on a wireless device 600, schematically shown in FIG. 6. It may be implemented as software, such as a computer program being executed within the wireless device 600, and instructing the wireless device 600 to conduct the method of the example embodiment.

The wireless device 600 comprises a processor module 602, an input module such as a keypad 604 and an output module such as a display 606.

The processor module 602 is connected to a wireless network 608 via a suitable transceiver device 610, to enable wireless communication and/or access to e.g. the internet or other network systems such as Local Area Network (LAN), Wireless Personal Area Network (WPAN) or Wide Area Network (WAN).

The processor module 602 in the example includes a processor 612, a Random Access Memory (RAM) 614 and a Read Only Memory (ROM) 616. The processor module 602 also includes a number of Input/Output (I/O) interfaces, for example I/O interface 618 to the display 606, and I/O interface 620 to the keypad 604.

The components of the processor module 602 typically communicate via an interconnected bus 622 and in a manner known to the person skilled in the relevant art.

The application program is typical supplied to the user of the wireless device 600 encoded on a data storage medium such as a flash memory module or memory card/stick and read utilising a corresponding memory reader-writer of a data storage device 624. The application program is read and controlled in its execution by the processor 612. Intermediate storage of program data may be accomplished using RAM 614.

Figure 7:
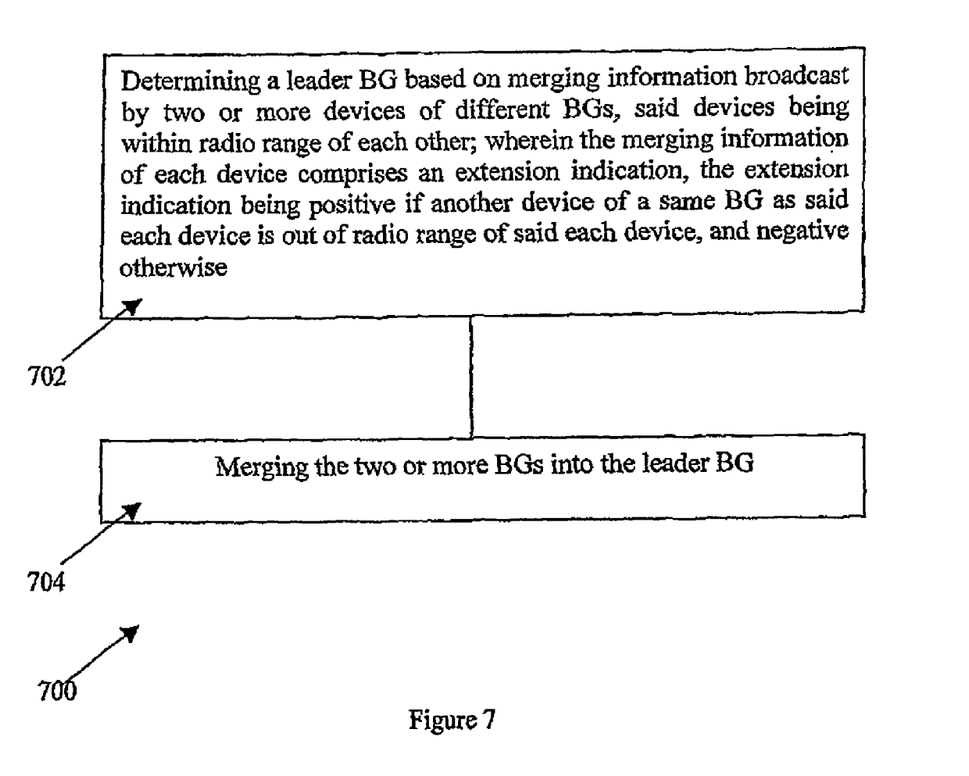
FIG. 7 shows a flow chart illustrating a method of merging two or more beacon groups (BGs) in an example embodiment.

FIG. 7 shows a flow chart 700 illustrating a method of merging two or more beacon groups (BGs) in an example embodiment. At step 702, a leader BG is determined based on merging information broadcast by two or more devices of different BGs, said devices being within radio range of each other and wherein the merging information of each device comprises an extension indication, the extension indication being positive if another device of a same BG as said each device is out of radio range of said each device, and negative otherwise. At step 704, the two or more BGs are merged into the leader BG.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of merging two or more beacon groups (BGs), each BG comprising one or more wireless devices, the method comprising: determining a leader BG based on merging information broadcast by two or more devices of different BGs, said devices being within radio range of each other, and merging the two or more BGs into the leader BG; wherein the merging information of each device comprises an extension indication, the extension indication being positive if another device of a same BG as said each device is out of radio range of said each device but heard by a neighbouring device that is itself within radio range of said each device, and negative if all devices of the same BG as said each device are within radio range of said each device; and wherein the merging information further comprises a number of neighbouring devices of the same BG and within radio range of said each device.

2. The method as claimed in claim 1, wherein, if the respective indications of all of the two or more devices are negative, the leader BG is chosen as the BG of the device having the highest number of neighbouring devices.

3. The method as claimed in claim 2, wherein, if there are two or more devices having the same highest number, the leader BG is determined based on an age of the different BGs.

4. The method as claimed in claim 1, wherein, if one or more of the respective indications of the two or more devices are positive, the leader BG is determined based on an age of the different BGs.

5. The method as claimed in claim 4, wherein devices with a negative indication having a number of neighboring devices lower than any one of the devices with a positive indication are excluded prior to determining the leader BG based on the age of the different BGs.

6. The method as claimed in claim 3, wherein, if two or more BGs have the same age, the leader BG is determined based on an earliest beacon period start time between said two or more BGs.

7. A wireless device for use in BG-based networking, the device comprising: means for broadcasting merging information of the device; means for receiving merging information of one or more other devices from one or more other BGs; means for determining a leader BG based on the merging information of the device and the merging information of the other devices, and means for merging the BGs into the leader BG; wherein the merging information of each device comprises an extension indication, the extension indication being positive if another device of a same BG as said each device is out of radio range of said each device but heard by a neighbouring device that is itself within radio range of said each device, and negative if all devices of the same BG as said each device are within radio range of said each device; and wherein the merging information further comprises a number of neighbouring devices of the same BG and within radio range of said each device.

8. The wireless device as claimed in claim 7, wherein, if the respective indications of all of the devices are negative, the means for determining a leader BG chooses the leader BG as the BG of the device having the highest number of neighbouring devices.

9. The wireless device as claimed in claim 8, wherein, if there are two or more devices having the same highest number, the means for determining a leader BG determines the leader BG based on an age of the different BGs.

10. The wireless device as claimed in claim 7, wherein, if one or more of the respective indications of the devices are positive, the means for determining a leader BG determines the leader BG based on an age of the different BGs.

11. The wireless device as claimed in claim 10, wherein devices with a negative indication having a number of neighboring devices lower than any one of the devices with a positive indication are excluded prior to determining the leader BG based on the age of the different BGs.

12. The wireless device as claimed in claim 9, wherein, if two or more BGs have the same age, the means for determining a leader BG determines the leader BG based on an earliest beacon period start time between said two or more BGs.

13. A storage device having stored thereon computer code means for instructing a wireless device to execute a method of merging two or more beacon groups (BGs), each BG comprising one or more wireless devices, the method comprising: determining a leader BG based on merging information broadcast by two or more devices of different BGs, said devices being within radio range of each other; and merging the two or more BGs into the leader BG; wherein the merging information of each device comprises an extension indication, the extension indication being positive if another device of a same BG as said each device is out of radio range of said each device but heard by a neighbouring device that is itself within radio range of said each device, and negative if all devices of the same BG as said each device are within radio range of said each device; and wherein the merging information further comprises a number of neighbouring devices of the same BG and within radio range of said each device.

* * * * *